United States Patent
Takagi

(10) Patent No.: US 11,330,231 B2
(45) Date of Patent: May 10, 2022

(54) IMAGING APPARATUS, CONTROL METHOD THEREOF, AND RECORDING MEDIUM

(71) Applicant: CANON KABUSHIKI KAISHA, Tokyo (JP)

(72) Inventor: Toshiyuki Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 16/821,760

(22) Filed: Mar. 17, 2020

(65) Prior Publication Data

US 2020/0304760 A1  Sep. 24, 2020

(30) Foreign Application Priority Data

Mar. 23, 2019 (JP) .............................. JP2019-055762

(51) Int. Cl.
| | |
|---|---|
| *H04N 7/18* | (2006.01) |
| *H04W 4/80* | (2018.01) |
| *H04W 52/02* | (2009.01) |
| *H04W 8/00* | (2009.01) |

(52) U.S. Cl.
CPC .............. *H04N 7/185* (2013.01); *H04W 4/80* (2018.02); *H04W 8/005* (2013.01); *H04W 52/0261* (2013.01)

(58) Field of Classification Search
CPC ....................................................... H04W 4/80
See application file for complete search history.

(56) References Cited

U.S. PATENT DOCUMENTS

| | | | | |
|---|---|---|---|---|
| 2014/0181012 A1* | 6/2014 | Min | ...................... | H04W 12/02 707/610 |
| 2016/0360343 A1* | 12/2016 | Shi | ......................... | H04W 76/14 |
| 2017/0034329 A1* | 2/2017 | Sakai | .................... | H04W 4/025 |
| 2018/0049127 A1* | 2/2018 | Hu | .................... | H04W 52/0229 |
| 2020/0127952 A1* | 4/2020 | Yang | ....................... | G06F 21/32 |

FOREIGN PATENT DOCUMENTS

JP   2014-116805 A   6/2014

* cited by examiner

*Primary Examiner* — Wen W Huang
(74) *Attorney, Agent, or Firm* — Canon U.S.A., Inc. IP Division

(57) ABSTRACT

An imaging apparatus includes a communication unit, an operation unit, and an imaging unit to capture an image as imaging data, and a recording unit. Where connection is established with an external apparatus, identification information about the external apparatus is recorded. Where the image is captured in a state where the identification information about the external apparatus is recorded, the recording unit records, as a transmission target, the imaging data captured by the imaging unit. Where an operation to transition from a first state to a second state having power consumption lower than that of the first state is accepted, the imaging data transmission target is transmitted to a first external apparatus connected most recent by the communication unit. Where connection is established with a second external apparatus based on an accepted user operation, the imaging data recorded as the transmission target is managed as a non-transmission target.

32 Claims, 10 Drawing Sheets

FIG.4A

| | | |
|---|---|---|
| | Bluetooth SETTINGS | |
| 400 | Bluetooth | OFF |
| 410 | SET DEVICE TO BE CONNECTED | |
| 420 | AUTOMATICALLY TRANSMIT IMAGES | NO |

FIG.4B

| | | |
|---|---|---|
| | Bluetooth SETTINGS | |
| 400 | Bluetooth | ON |
| 410 | SET DEVICE TO BE CONNECTED | |
| 420 | AUTOMATICALLY TRANSMIT IMAGES | NO |

FIG.5

| IMAGE DATA | TRANSMISSION STATUS |
|---|---|
| IMG_0001.jpg | TRANSMISSION COMPLETED |
| IMG_0002.jpg | TRANSMISSION COMPLETED |
| IMG_0003.jpg | TRANSMISSION FAILED |
| IMG_0004.jpg | TRANSMISSION FAILED |
| IMG_0005.jpg | TRANSMISSION RESERVED |
| IMG_0006.jpg | TRANSMISSION RESERVED |

FIG.9

DEVICE TO BE WIRELESSLY
CONNECTED WILL BE SWITCHED.
CLEAR TRANSMISSION LIST?

YES   NO

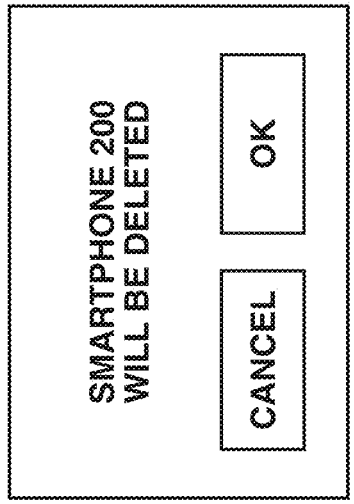
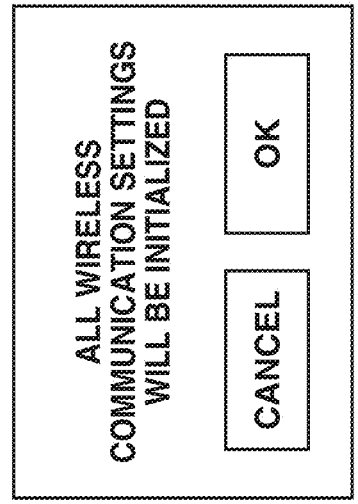

IMAGING APPARATUS, CONTROL METHOD THEREOF, AND RECORDING MEDIUM

BACKGROUND

Field

The present disclosure relates to an imaging apparatus that can wirelessly connect to an external apparatus.

Description of the Related Art

Recent imaging apparatuses such as a digital camera are capable of wireless communication with an external apparatus such as a smartphone. A user can transmit image data or moving image data captured by a digital camera from the digital camera to a smartphone by wireless communication, and browse the image data captured by the digital camera by using the smartphone. A digital camera can further make a transmission reservation about captured data and transmit the data in response to a request from a smartphone. Japanese Patent Application Laid-Open No. 2014-116805 discusses a digital camera that can generate a list of captured video data and transmit the video data based on a request from an information processing apparatus.

However, if a communication partner is switched in a state where a transmission reservation is made for the image data, the digital camera may transmit the image data that is supposed to be transmitted to the previous communication partner to a new communication partner.

SUMMARY

According to an aspect of the present disclosure, an imaging apparatus includes a communication unit configured to communicate with an external apparatus, an operation unit configured to accept a user operation, an imaging unit configured to capture an image as imaging data, a recording unit configured to record data in the recording unit, and a control unit configured to perform operations including: controlling, in a case where connection is established with the external apparatus via the communication unit, the recording unit to record identification information about the external apparatus, controlling, in a case where the imaging unit captures the image in a state where the identification information about the external apparatus is recorded, the recording unit to record, as a transmission target, the imaging data captured by the imaging unit, controlling, in a case where an operation to transition from a first power supply state to a second power supply state having power consumption lower than that of the first power supply state is accepted by the operation unit, the communication unit to transmit the imaging data transmission target to a first external apparatus connected most recent by the communication unit, and managing, in a case where connection is established with a second external apparatus different from the first external apparatus by the communication unit based on the user operation accepted by the operation unit, the imaging data recorded as the transmission target as a non-transmission target.

Further features of the present disclosure will become apparent from the following description of exemplary embodiments with reference to the attached drawings.

BRIEF DESCRIPTION OF THE DRAWINGS

FIG. 4A illustrates an example of a screen displaying an example of Bluetooth® initial settings according to the first exemplary embodiment. FIG. 4B illustrates an example of a screen displaying an example of Bluetooth settings according to the first exemplary embodiment.

FIG. 5 illustrates an example of a transmission list according to the first exemplary embodiment.

FIG. 9 illustrates an example of a screen displayed when the digital camera according to the first exemplary embodiment switches wireless connection.

FIG. 10A illustrates an example of a screen for editing and deleting the communication settings of devices for a digital camera according to a second exemplary embodiment to connect wirelessly. FIG. 10B illustrates an example of a screen for changing and deleting the communication settings of a smartphone to which the digital camera according to the second exemplary embodiment is wirelessly connected. FIG. 10C illustrates an example of a confirmation screen displayed when the digital camera according to the second exemplary embodiment deletes the communication settings of the wirelessly connected device. FIG. 10D illustrates an example of a confirmation screen displayed when the digital camera according to the second exemplary embodiment deletes all the communication settings of the devices to be wirelessly connected.

DESCRIPTION OF THE EMBODIMENTS

Exemplary embodiments of the present disclosure will be described in detail below with reference to the accompanying drawings.

<Configuration of Digital Camera>

Figure 1A:
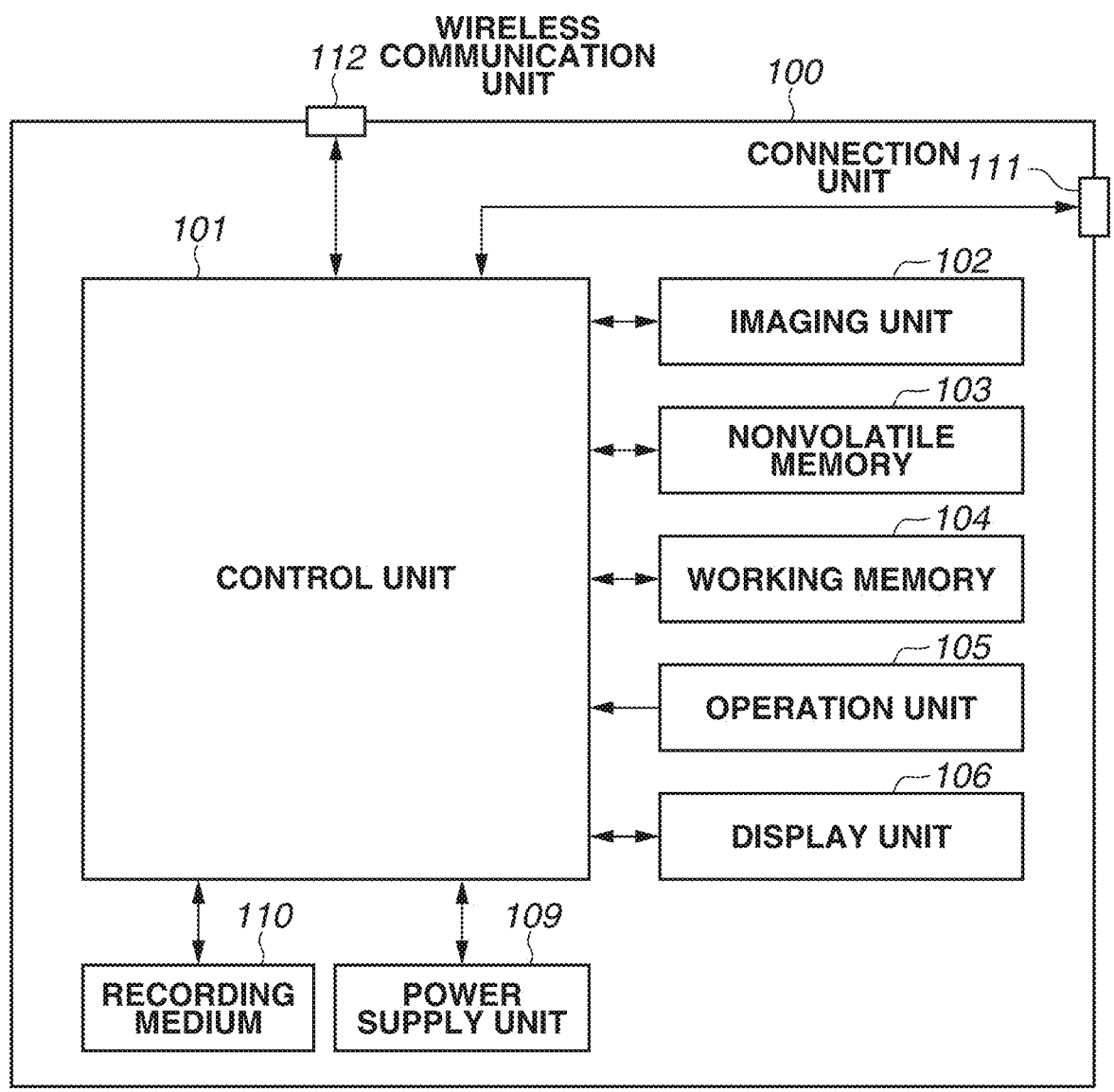
FIG. 1A is a block diagram illustrating an example of a configuration of a digital camera according to a first exemplary embodiment.
Figure 1B:
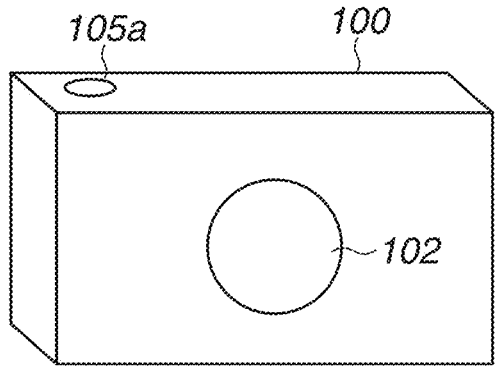
FIGS. 1B and 1C are examples of perspective views of the digital camera according to the first exemplary embodiment.
Figure 1C:
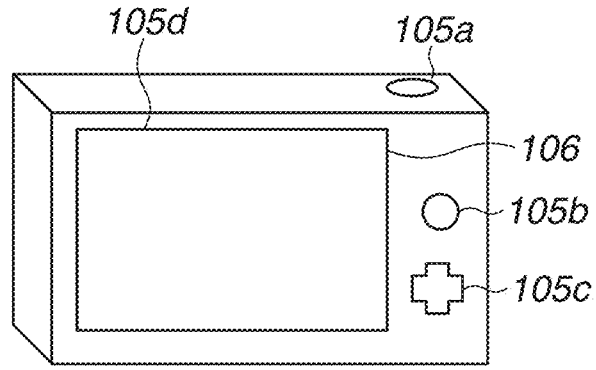

FIG. 1A is a block diagram illustrating a configuration example of a digital camera 100 that is an example of an imaging apparatus according to a first exemplary embodiment. FIGS. 1B and 1C are perspective views of the digital camera 100. While the digital camera 100 is described here as an example of the imaging apparatus, the imaging apparatus is not limited thereto. For example, the imaging apparatus may be an information processing apparatus, such as a smartphone, and a smartwatch.

A control unit 101 controls various parts of the digital camera 100 based on input signals and a program described below. Instead of the control unit 101 controlling the entire imaging apparatus, a plurality of pieces of hardware may control the entire imaging apparatus by performing processing in a distributed manner.

An imaging unit 102 includes, an optical lens unit, an optical system, and an image sensor. The optical system controls, for example, aperture, zooming, and focus. The image sensor converts light (e.g., image) input through the optical lens unit into an electrical video image. A complementary metal-oxide-semiconductor (CMOS) sensor or a charge-coupled device (CCD) sensor is typically used as the image sensor. The imaging unit 102 is controlled by the control unit 101 to convert object light focused by a lens included in the imaging unit 102 into an electrical signal by using the image sensor. The imaging unit 102 performs noise reduction processing and outputs digital data as image data. The digital camera 100 according to the present exemplary embodiment records the image data on a recording medium 110 according to the Design rule for Camera File system (DCF) standard.

A nonvolatile memory 103 is an electrically erasable and recordable nonvolatile memory. The nonvolatile memory 103 stores the program (described below) executed by the control unit 101.

A working memory 104 is used as, for example, a buffer memory for temporarily storing the image data captured by the imaging unit 102, an image display memory of a display unit 106, and a work area of the control unit 101.

An operation unit 105 is a user interface for accepting, from a user, instructions for the digital camera 100. The operation unit 105 may include a power button for the user to give instructions to power on/off the digital camera 100, a release switch for the user to give instructions to capture an image, and a playback button for the user to give instructions to play back image data. The operation unit 105 may also include operation members, such as a dedicated connection button to start communication with an external apparatus via a wireless communication unit 112. The operation unit 105 may further include a touch panel provided on the display unit 106. The release button includes switches SW1, and SW2. When the release switch is half pressed, the switch SW1 turns on. The operation unit 105 thereby accepts instructions to perform imaging preparation processing such as automatic focus (AF) processing, automatic exposure (AE) processing, automatic white balance (AWB) processing, and electronic flash (EF) (preliminary flash emission) processing. When the release switch is so-called fully pressed, the switch SW2 turns on. The operation unit 105 thereby accepts an instruction to capture an image.

The display unit 106 displays, for example, a viewfinder image during image capturing, captured image data, and characters for interactive operations. The display unit 106 is not necessarily built in the digital camera 100. The digital camera 100 only has to be connectable to an internal or external display unit 106, and to have at least a display control function to control display on the display unit 106.

A power supply unit 109 is controlled by the control unit 101, and thereby being capable to supply power to various components of the digital camera 100. Examples of the power supply unit 109 include power sources, such as a lithium ion battery, and an alkaline manganese dry battery.

The recording medium 110 can record the image data output from the imaging unit 102. The recording medium 110 may be configured to be detachable from and attachable to the digital camera 100. The recording medium 110 may also be built in the digital camera 100. In other words, the digital camera 100 may include a unit for accessing at least the storage medium 110.

A connection unit 111 is an interface for connecting to an external apparatus. The digital camera 100 according to the present exemplary embodiment can exchange data with the external apparatus via the connection unit 111. The digital camera 100 can transmit, for example, the image data generated by the imaging unit 102 to the external apparatus via the connection unit 111.

The wireless communication unit 112 includes an antenna for wireless communication, a modulation/demodulation circuit for processing wireless signals, and a communication controller. The wireless communication unit 112 outputs a modulated wireless signal from the antenna and demodulates a wireless signal received by the antenna, thereby performing short-range wireless communication with an external apparatus. In the present exemplary embodiment, the wireless communication unit 112 communicates in compliance with Bluetooth®, which is a communication standard developed by the Bluetooth Special Interest Group (Bluetooth SIG). For example, the digital camera 100 can transmit the image data generated by the imaging unit 102 to the external apparatus via the wireless communication unit 112. The wireless communication unit 112 may be an interface for communicating with an external apparatus via a wireless local area network (LAN) compliant with the Institute of Electrical and Electronics Engineers (IEEE) 802.11 standards. The control unit 101 only has to be able to achieve wireless communication with the external apparatus by controlling the wireless communication unit 112.

The digital camera 100 according to the present exemplary embodiment has three power supply states including a power on state, a sleep state, and a power off state. The power on state is a state where power is distributed to the entire digital camera 100. The "state where power is distributed to the entire digital camera 100" does not refer to a state where all the elements and one or more circuits included in the digital camera 100 are supplied power. The state refers to a state where at least the members required for processing according to the present exemplary embodiment are supplied power. The sleep state is a state where at least the control unit 101 is supplied power, and at least the imaging unit 102 and the display unit 106 are not supplied power. The sleep state is a state in which more power is saved than in the power on state. The power off state is a state where at least the control unit 101, the imaging unit 102, and the display unit 106 are not supplied power, and parts required for controlling the power supply unit 109 are supplied power. The power off state is a state in which less power is consumed than in the sleep state.

The digital camera 100 enters the sleep state in a period where the user is less likely to operate the digital camera 100. For example, the digital camera 100 enters the sleep state, if the digital camera 100 in the power on state determines that no operation has been accepted from the user for a predetermined time or more. This reduces the power consumption in the period where the user is less likely to operate the digital camera 100. If the digital camera 100 is in the sleep state, the digital camera 100 enters the power on state when a member of the operation unit 105, such as the power button and a menu button, is operated.

If a power off instruction from the user is accepted, the digital camera 100 enters the power off state. For example, the digital camera 100 enters the power off state, if the power button is pressed in the power on state. If the digital camera 100 is in the power off state, the digital camera 100 enters the power on state when the power button is pressed. In the power off state however, the digital camera 100 does not enter the power on state even if operation members, such as the release switch and the touch panel, are operated. This processing is intended to reduce the possibility of accidental activation of the digital camera 100 due to a collision impact of the digital camera 100 with goods in a bag, since the user may carry the digital camera 100 in the power off state in the bag. The digital camera 100 in the sleep state can enter the power on state in a shorter time than the digital camera 100 in the power off state.

In a case where an image data automatic transmission function described below is on, the digital camera 100 according to the present exemplary embodiment transmits image data to a smartphone connectable via the wireless communication unit 112 when triggered by a power off instruction from the user. At this time, the digital camera 100 transmits the image data in the power on state, not in the power off state. The reason for using the reception of the power off instruction from the user as a trigger is that the user is considered to be unlikely to operate the digital camera 100 for a while when the user sends the power off instruction. The reason for transmitting the image data in the power on state is that the load of the processing for transmitting image data is typically high. Such high-load processing is difficult for the digital camera 100 to perform in the power off state or a power saving state such as the sleep state. By transmitting the image data in such a manner, the digital camera 100 can transmit a large amount of image data in a period where the user is less likely to operate the digital camera 100.

The digital camera 100 may once enter the power off state, and then enter the power on state to start the automatic transmission of image data. The reason is that even if the digital camera 100 remains in the power on state and transmits the image data despite the acceptance of the power off instruction, the user may understand the digital camera 100 is malfunctioning. Meanwhile, if the digital camera 100 once enters the power off state before starting the transmission of the image data, the user can recognize that his/her own operation has been accepted, whereby the possibility of mistake can be reduced.

<Network System Configuration>

Figure 2:
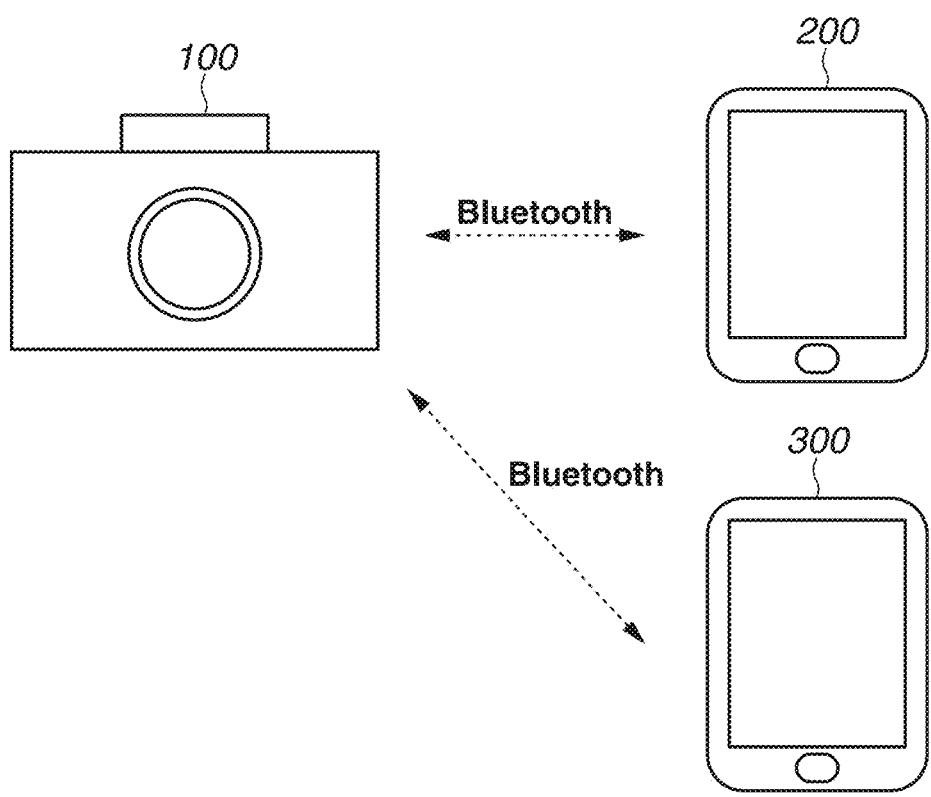
FIG. 2 is a diagram illustrating an example of a network configuration of the digital camera and smartphones according to the first exemplary embodiment.

FIG. 2 is a diagram illustrating an example of a network system according to the present exemplary embodiment. In the present exemplary embodiment, the digital camera 100 communicates with a smartphone 200 or a smartphone 300 via the wireless communication unit 112 in compliance with Bluetooth.

Bluetooth will now be described. Two communication apparatuses communicating in compliance with Bluetooth have respective roles as a central and a peripheral. Bluetooth communication apparatuses are connected in a master-slave star network configuration. A communication apparatus operating as a central (hereinafter, referred to as a central apparatus) serves as a master, and a communication apparatus operating as a peripheral (hereinafter, referred to as a peripheral apparatus) serves as a slave. The central apparatus manages participation of the peripheral apparatuses in the network and sets various parameters for wireless connection with the peripheral apparatuses. A central apparatus can be simultaneously connected to a plurality of peripheral apparatuses while a peripheral apparatus can establish wireless connection with one central apparatus at a time. In the present exemplary embodiment, the digital camera 100 operates as a peripheral apparatus, and the smartphones 200 and 300 as central apparatuses.

In the present exemplary embodiment, the digital camera 100 can be paired with a plurality of smartphones, and record pairing information about the smartphones in the nonvolatile memory 103. Pairing refers to processing by which a central apparatus and a peripheral apparatus register each other's identification information (e.g., record in a predetermined area). In the present exemplary embodiment, the digital camera 100 and a smartphone register each other's identification information. The digital camera 100 then establishes wireless connection with the smartphone, and thereby determines that pairing is completed. Since the digital camera 100 is a peripheral apparatus, the digital camera 100 selects one of already paired smartphones for connection. An example of a method for setting a device to be wirelessly connected will be described with reference to FIGS. 3A and 3B.

Figure 3B:
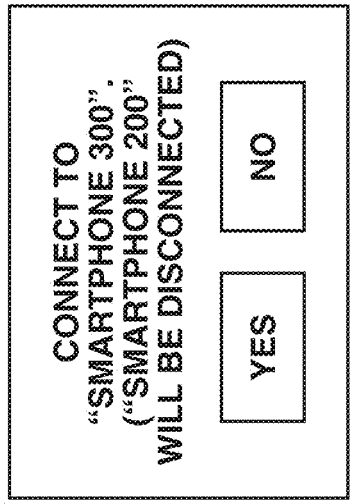
FIG. 3B illustrates an example of a confirmation screen displayed when the digital camera according to the first exemplary embodiment switches the device to be wirelessly connected.
Figure 3D:
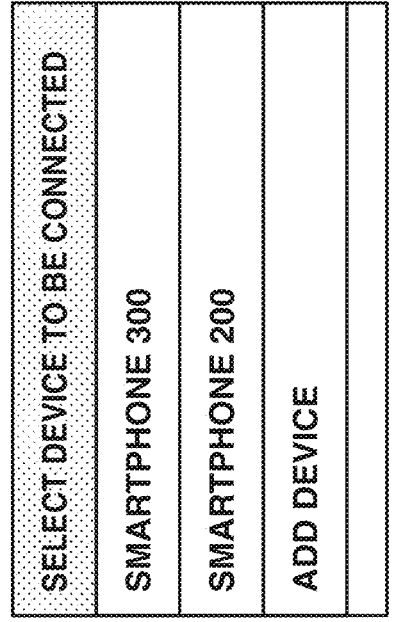
FIG. 3D illustrates an example of a screen after the wireless connection of the digital camera according to the first exemplary embodiment is disconnected.
Figure 3A:
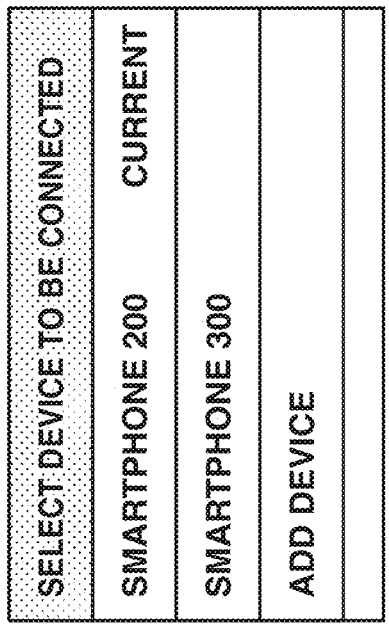
FIG. 3A illustrates an example of a screen for selecting a device to be wirelessly connected to the digital camera according to the first exemplary embodiment.

FIG. 3A illustrates an example of a screen of the digital camera 100 for setting a device to be wirelessly connected. For example, the digital camera 100 displays the screen on the display unit 106 up on selection of an item related to wireless communication by the operation unit 105 from a setting menu displayed on the display unit 106. On this screen, the user can select and add a device to be connected to the digital camera 100. A screen illustrated in FIG. 3A indicates that the digital camera 100 has already been paired with the smartphones 200 and 300. In FIG. 3A, the smartphone 200 is displayed to be in a state "current". This indicates that the digital camera 100 is currently connected to the smartphone 200. If the user operates the operation unit 105 to select "add device", the digital camera 100 starts pairing with another central apparatus.

Figure 3C:
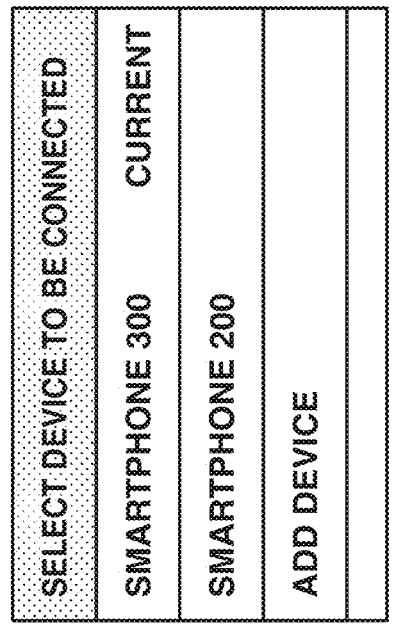
FIG. 3C illustrates an example of a screen after the device wirelessly connected to the digital camera according to the first exemplary embodiment is switched.

If the user operates the operation unit 105 to select the smartphone 300, the digital camera 100 displays a screen illustrated in FIG. 3B, for example. On the screen illustrated in FIG. 3B, the digital camera 100 inquires of the user whether to switch the device to be wirelessly connected from the currently-connected smartphone 200 to the smartphone 300. If "yes" is selected in a user operation, the digital camera 100 disconnects the wireless connection with the smartphone 200, and establishes wireless connection with the smartphone 300. In this case, the smartphone 300 enters the state "current" as illustrated in FIG. 3C. An item representing the smartphone 300 moves to the top as illustrated in FIG. 3C. If "no" is selected by a user operation, the digital camera 100 does not switch the connection with the smartphone 200, and returns to the screen illustrated in FIG. 3A.

If the user disconnects the wireless connection between the digital camera 100 and the smartphone 300, the digital camera 100 does not display the indication "current" as illustrated in FIG. 3D. However, the digital camera 100 displays the item representing the smartphone 300 at the top to indicate that the latest device wirelessly connected is the smartphone 300. The method for indicating the latest device wirelessly connected is not limited thereto. For example, a mark "*" may be displayed on the item representing the latest device wirelessly connected. The font or size of the characters on the item may be changed.

<Settings for Image Data Automatic Transmission>

The digital camera 100 according to the present exemplary embodiment has an automatic transmission function to automatically transmit captured image data to a smartphone. By using this function, the digital camera 100 can transmit the captured image data to the smartphone while the user is not operating the digital camera 100. In the present exemplary embodiment, the digital camera 100 transmits the image data in compliance with Bluetooth.

First, settings for using the automatic transmission function will be described. FIG. 4A illustrates an example of a screen displaying Bluetooth initial settings. Using an item 400, the user can set whether to use Bluetooth wireless communication function with the digital camera 100. Using an item 410, the user can set the device to be connected to the digital camera 100. Using an item 420, the user can set whether to transmit image data captured by the digital camera 100 automatically to a smartphone (e.g., "yes" or "no"). The item 400 is set to off in the initial settings. In this case, since the wireless communication unit 112 is not used, the item 410 is displayed not to accept user operations. The item 420 is also displayed not to be changeable by user operations. For example, the control unit 101 displays the items 410 and 420 with shading to indicate that the items 410 and 420 are not selectable. Alternatively, the control unit 101 may inform the user that the item 420 is not selectable by not displaying the item 420 or by making no response to operations on the item 420. If the item 410 is selected, the digital camera 100 transitions to a screen as illustrated in FIG. 3A, and displays a setting screen related to the device to be connected wirelessly in Bluetooth.

If the item 400 is "on", the digital camera 100 supplies power to the wireless communication unit 112, in the sleep state and the power off state. The digital camera 100 can thereby maintain wireless communication with a smartphone even in the sleeve state and the power off state, for example, by Bluetooth Low Energy with low power consumption. Using Bluetooth Low Energy based communication allows the user to, for example, shift the digital camera 100 to the power on state by operating the smartphone. If the item 400 is "off", the digital camera 100 does not supply power to the wireless communication unit 112 in the sleep state and the power off state. This can further reduce the power consumption of the digital camera 100.

If the digital camera 100 is not paired with an external device (there is no paired device), the item 420 is fixed to "no" to prevent a change by user operations. This is because there is no device for the digital camera 100 to transmit image data to if there is no device paired with the digital camera 100. In this case, the digital camera 100 does not generate a transmission list (described below).

Next, the execution of the image data automatic transmission function will be described. In the present exemplary embodiment, the digital camera 100 generates a transmission list when the user activates the image data automatic transmission function via the operation unit 105. The transmission list is, for example, a database. The transmission list is stored in, for example, the recording medium 110 or the nonvolatile memory 103. The digital camera 100 records information about captured image data in the transmission list. For example, the digital camera 100 starts processing for transmitting the image data recorded in the transmission list to a smartphone (e.g., smartphone 200), when the user operates the power button to shift the digital camera 100 to the power off state.

An example of the transmission list will be described with reference to FIG. 5. In the transmission list illustrated in FIG. 5, the digital camera 100 records the filenames of image data and the transmission statuses of the image data in association with each other. A transmission status is a parameter used to manage whether the digital camera 100 has automatically transmitted image data. While in the present exemplary embodiment this parameter is expressed by a character string, the parameter may be expressed by a numerical value.

If the image data automatic transmission function is enabled, the digital camera 100 adds subsequently captured image data to the transmission list. At this time, the image data is recorded with a parameter of "transmission reserved". For example, in the transmission list illustrated in FIG. 5, two pieces of image data "IMG_0005.jpg" and "IMG_0006.jpg" have the transmission status of "transmission reserved". The digital camera 100 starts to transmit the image data of which the transmission status is "transmission received" to the smartphone 200. When starting transmitting a piece of image data to the smartphone 200, the control unit 101 changes the transmission status of the image data being transmitted to "being transmitted".

If the transmission of a piece of image data to the smartphone 200 is completed, the digital camera 100 changes the transmission status of the transmission-completed image data from "being transmitted" to "transmission completed". For example, in the transmission list illustrated in FIG. 5, two pieces of image data "IMG_0001.jpg" and "IMG_0002.jpg" have the transmission status of "transmission completed". If a piece of image data fails to be transmitted to the smartphone 200, the control unit 101 changes the transmission status of the transmission-failed image data from "being transmitted" to "transmission failed". For example, in the transmission list illustrated in FIG. 5, two pieces of image data "IMG_0003.jpg" and "IMG_0004.jpg" have the transmission status "transmission failed".

The image data of which the transmission status is "transmission reserved" is automatically transmitted. Whereas, the image data of which the transmission status is "transmission failed" is not automatically re-transmitted to the smartphone 200. This is because, in a case where transmission of image data fails, the smartphone 200 can be unable to record the image data because the free area of the recording medium 110 of the smartphone 200 is small. On the other hand, the digital camera 100 may change the transmission status of the image data to "transmission reserved" if the transmission failure is caused by a poor radio condition. The reason in this case is that the transmission failure is caused by an external factor that is not ascribable to the digital camera 100 or the smartphone 200. Further, for example, the digital camera 100 may not be able to change the transmission status of image data of "being transmitted" if the digital camera 100 has entered the power off state due to a low battery level. In this case, for example, the digital camera 100 checks the transmission list in response to next transition to the power on state, and changes the transmission status of the image data from "being transmitted" to "transmission reserved". This is because the digital camera 100 can transmit the image data to the smartphone 200 when the user immediately replaces the battery. In such a manner, if image data fails to be transmitted, the digital camera 100 may change the transmission status of the image data based on the cause of the transmission failure.

Further, in a case where the image data automatic transmission function is set to "no" or the Bluetooth function is "off", the digital camera 100 does not record captured image data in the transmission list.

The digital camera 100 may not generate the transmission list and record the parameters about the transmission statuses in metadata of image data, and use the parameters instead of the transmission list. In this case, the digital camera 100 may record a parameter such as "unselected" as the transmission status of image data, which is not to be transmitted to the smartphone 200.

Figure 6:
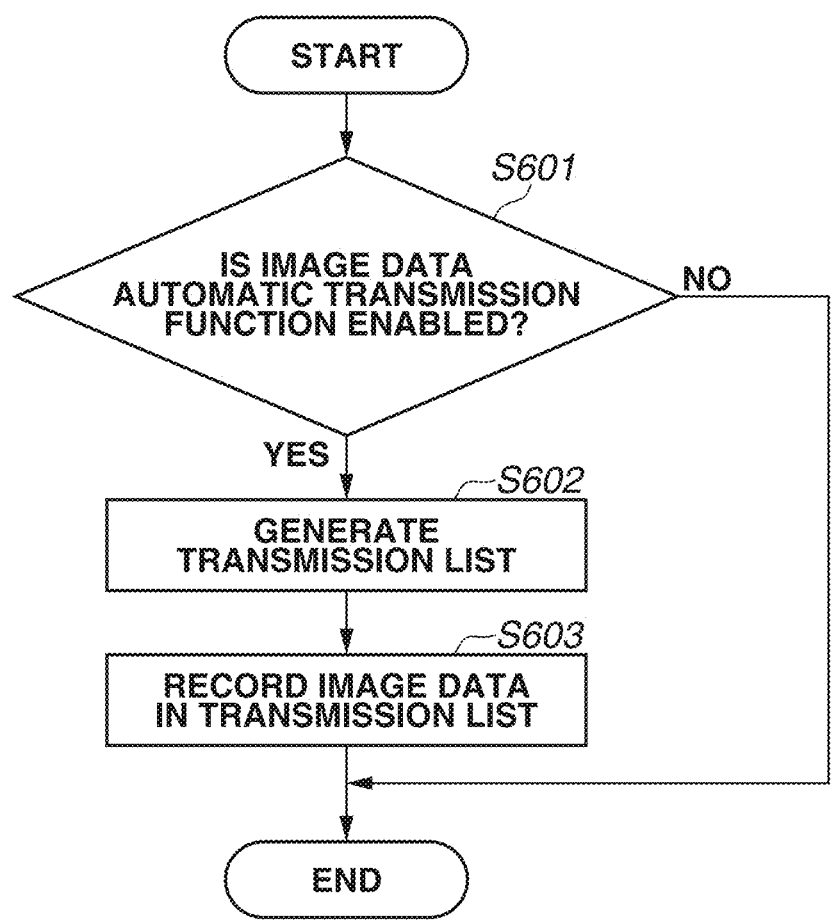
FIG. 6 is a flowchart illustrating an example of processing by which the digital camera according to the first exemplary embodiment records image data in the transmission list.

Next, processing by which the digital camera 100 records captured image data in the transmission list will be described with reference to FIG. 6. This processing of the digital camera 100 is implemented by the control unit 101 loading software recorded in the nonvolatile memory 103 into the working memory 104 and executing the software. The processing is started when triggered by the capturing of image data by the imaging unit 102. The processing is executed along with processing of recording the captured image data.

In step S601, the control unit 101 determines whether the image data automatic transmission function is enabled. For example, the control unit 101 determines whether the item 420 illustrated in FIG. 4B is "yes" or "no". If the image data automatic transmission function is enabled (e.g., the item 420 is "yes") (YES in step S601), the processing proceeds to step S602. If the image data automatic transmission function is disabled (e.g., the item 420 is "no") (NO in step S601), the processing ends.

In step S602, the control unit 101 generates a transmission list. If a transmission list is already recorded in the nonvolatile memory 103, the processing skips step S602.

In step S603, the control unit 101 records the captured image data in the transmission list. In the present exemplary embodiment, the control unit 101 records the filename of the image data. At this time, the control unit 101 records the transmission status of the image data as "transmission reserved".

The transmission list and the method where the digital camera 100 records image data in the transmission list have been described above.

If the control unit 101 adds the parameter about the transmission status to the metadata of the image data instead of generating the transmission list as described above, the control unit 101 records the parameter about the transmission status in metadata of the image data in step S602. The control unit 101 can thereby transmit the captured image data automatically, even if the control unit 101 does not generate the transmission list.

<Image Data Automatic Transmission Processing>

Figure 7:
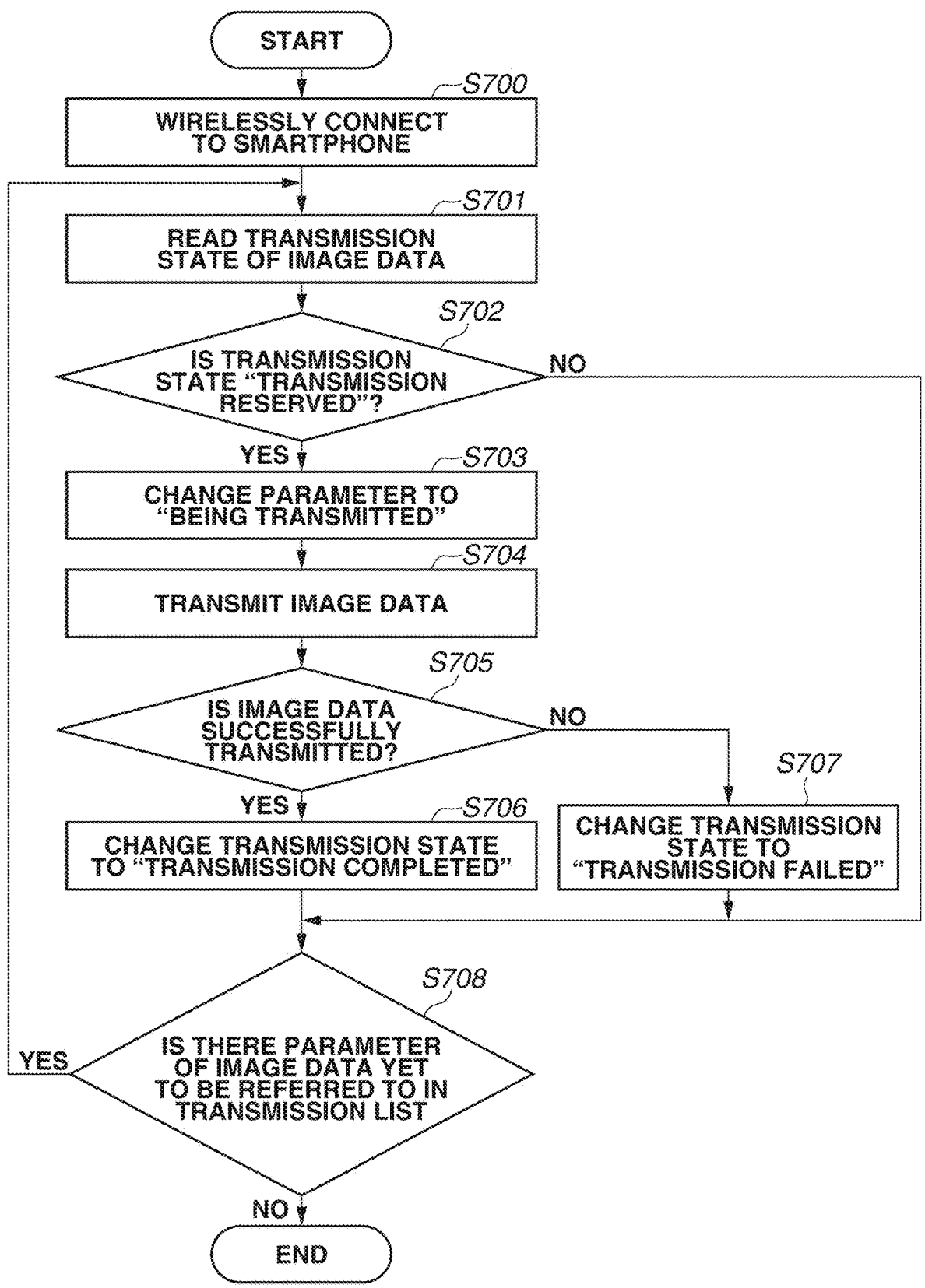
FIG. 7 is a flowchart illustrating an example of processing by which the digital camera according to the first exemplary embodiment automatically transmits image data to a smartphone.

Processing by which the digital camera 100 automatically transmits image data to the smartphone 200 will be described with reference to FIG. 7. This processing of the digital camera 100 is implemented by the control unit 101 loading software recorded in the nonvolatile memory 103 into the working memory 104 and executing the software. The processing is started when triggered by the digital camera 100 accepting the user's operation to transition to the power off state.

In step S700, the control unit 101 wirelessly connects to the smartphone 200. In the present exemplary embodiment, the digital camera 100 performs the processing for establishing wireless connection with the latest device wirelessly connected if the digital camera 100 automatically establishes wireless connection. For example, the control unit 101 wirelessly connects to the smartphone 200, which is the latest device wirelessly connected via the wireless communication unit 112. If the wireless connection with the smartphone 200 is already established, the processing skips step 700. If wireless connection with the smartphone 200 is unable to be established, the processing ends.

In step S701, the control unit 101 refers to the transmission list and reads the transmission status of a piece of image data. However, the control unit 101 reads the transmission status of a piece of image data that has not been read since the processing is started. For example, the control unit 101 reads the parameters (transmission statuses) in order of recording in the transmission list (so-called fast-in fast-out (FIFO) manner).

In step S702, the control unit 101 checks whether the transmission status of the image data read in step S701 is "transmission reserved". If the parameter of the image data is "transmission reserved" (YES in step S702), the processing proceeds to step S703. If the parameter is not "transmission reserved" (NO in step S702), the processing proceeds to step S708.

In step S703, the control unit 101 changes the parameter read in step S701 to "being transmitted".

In step S704, the control unit 101 transmits the image data associated with the parameter read in step S701 to the smartphone 200.

In step S705, the control unit 101 determines whether the image data is successfully transmitted. For example, the control unit 101 determines that the image data is successfully transmitted, if a notification indicating the completion of the reception of the image data is received from the smartphone 200. For example, the control unit 101 determines that the transmission of the image data has failed, if a notification indicating an error is received from the smartphone 200 or the communication with the smartphone 200 is disconnected. If the control unit 101 succeeds in transmitting the image data (YES in step S705), the processing proceeds to step S706. If the control unit 101 fails in transmitting the image data (NO in step S705), the processing proceeds to step S707.

In step S706, the control unit 101 changes the transmission status read from the transmission list in step S701 to "transmission completed". For example, the control unit 101 records the parameter "transmission completed" in the transmission list as the transmission status of the image data transmitted in step S705.

In step S707, the control unit 101 changes the transmission status read in step S701 to "transmission failed". For example, the control unit 101 records the parameter "transmission failed" in the transmission list as the transmission status of the image data attempted to be transmitted in step S704.

In step S708, the control unit 101 refers to the transmission list and determines whether there is a parameter of image data yet to be referred to. If there is a parameter of image data yet to be referred to (YES in step S708), the processing returns to step S701 and the control unit 101 repeats the processing. If there is no parameter of image data yet to be referred to (NO in step S708), the processing ends.

The image data automatic transmission processing of the digital camera 100 has been described above. In the present exemplary embodiment, the digital camera 100 thus transmits image data recorded in the transmission list with the transmission status "transmission reserved" to the smartphone 200.

In a case where a plurality of paired devices exists, the control unit 101 may attempt wireless connection with another paired device even if wireless connection cannot be done with the smartphone 200 in step S700. At this case, the digital camera 100 firstly attempts to connect to a device of which the date and time of latest connection is newer. This is because a device with newer date and time of connection is likely to be possessed by the user than a device with older date and time of connection. The digital camera 100 can thereby transmit image data to a device that the user currently possesses even if the user does not possess the device wirelessly connected latest to the digital camera 100.

<Processing when Wirelessly Connected Device is Changed>

Next, a case will be described where the smartphone to which the digital camera 100 is wirelessly connected is changed by user operations in a state where there is image data recorded as "transmission reserved" in the transmission list. Examples of possible scenes include the following: The user works as a photographer, and possesses the smartphone 200 for work and the smartphone 300 for private use. The user transmits image data captured during work to the smartphone 200, and transmits image data captured in his/her private time to the smartphone 300. The user takes both pictures for work and pictures for private use by using the same digital camera 100. For example, suppose that the user captures an image for work by using the digital camera 100 while the digital camera 100 is wirelessly connected to the smartphone 200 as illustrated in FIG. 3A. In such a scene, the user is considered to intend to transmit the image data to the wirelessly connected smartphone 200 during image capturing. In private time after the user finishes his/her work, the user may switch the wireless connection to the smartphone 300 as described in FIGS. 3B and 3C before the digital camera 100 transmits the image data to the smartphone 200. In such a case, the digital camera 100 automatically transmits the image data captured for work to the smartphone 300, not to the smartphone 200, in response to the reception of an operation to transition to the power off state. If the user thus switches the smartphone wirelessly connected to the digital camera 100 in a state where there is image data of which the transmission status is "transmission reserved", the digital camera 100 may transmit the image data to the smartphone not intended by the user. To address such an issue, the digital camera 100 records a transmission list for each device to be wirelessly connected. However, the user who switches the device wirelessly connected to the digital camera 100 may no longer need the image data captured before the switching of the connection. For example, in the foregoing example, the user has already manually transmitted image data to be used for work to the smartphone 200, and thus the remaining image data of which the transmission status is "transmission reserved" may no longer be useless to the user. For such a reason, it is desirable that the digital camera 100 update the transmission list each time the wireless connection is changed, not record a transmission list for each device to be wirelessly connected.

Figure 8:
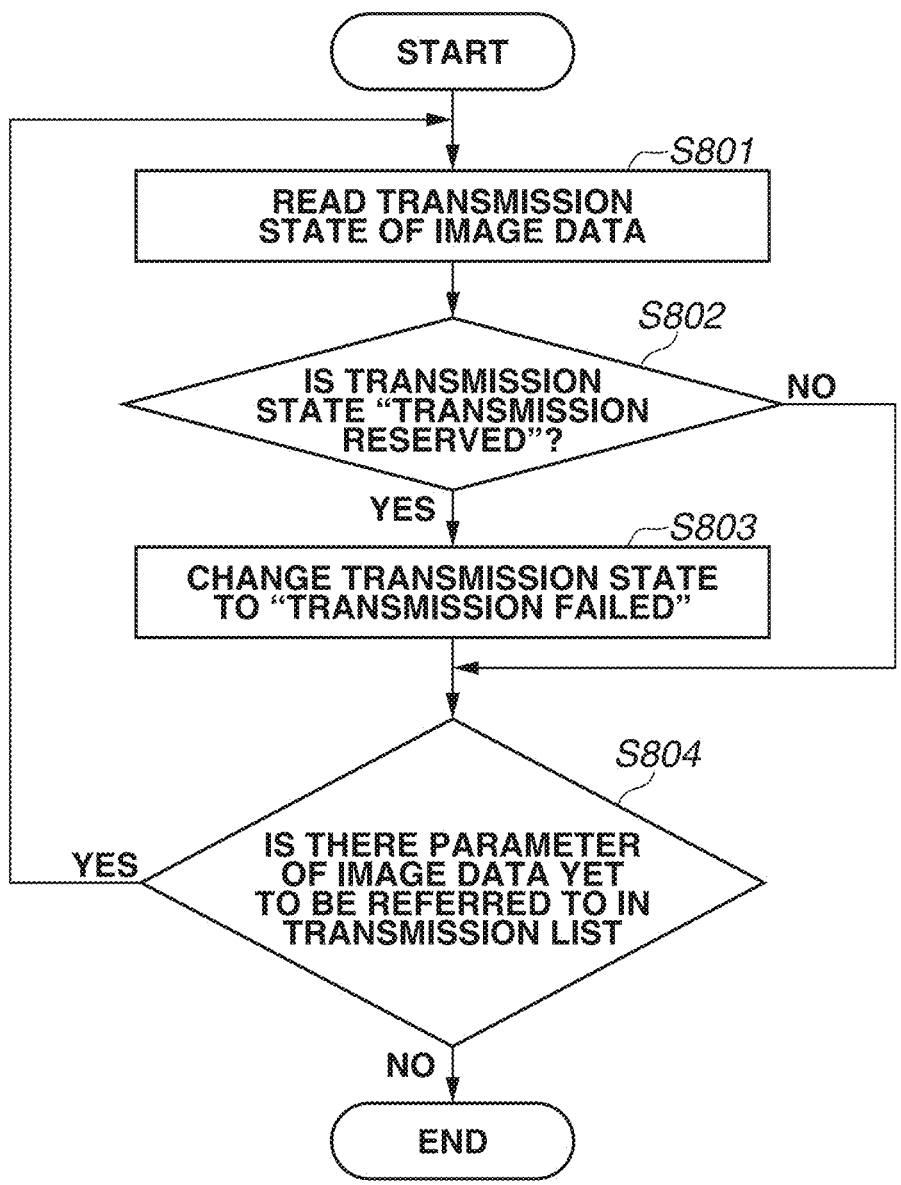
FIG. 8 is a flowchart illustrating an example of processing by which the digital camera according to the first exemplary embodiment updates the transmission list.

The processing by which the digital camera 100 updates the transmission list will be described with reference to FIG. 8. In the present exemplary embodiment, the digital camera 100 switches wireless connection from the smartphone 200 to the smartphone 300. This processing of the digital camera 100 is implemented by the control unit 101 loading software recorded in the nonvolatile memory 103 into the working memory 104 and executing the software. The processing is started when triggered by the switching of the device to be wirelessly connected. In the present exemplary embodiment, if there is established a wireless connection, the timing at which the digital camera 100 determines that the wireless connection is switched is when the digital camera 100 establishes wireless connection with a device other than the one in the state "current". If there is no wireless connection established, the timing when the wireless connection is determined to be switched is when the digital camera 100 establishes wireless connection with a device other than the latest one with which wireless connection is established.

In step S801, the control unit 101 refers to the transmission list and reads the transmission status of a piece of image data. This processing is similar to the processing of step S701 in FIG. 7.

In step S802, the control unit 101 checks whether the transmission status read in step S801 is "transmission reserved". If the control unit 101 determines that the transmission status is "transmission reserved" (YES in step S802), the processing proceeds to step S803. If the control unit 101 determines that the transmission status is not "transmission reserved" (NO in step S802), the processing proceeds to step S804.

In step S803, the control unit 101 changes the transmission status of the image data associated with the parameter read in step S801 to "transmission failed". For example, the control unit 101 records the parameter "transmission failed" in the transmission list as the transmission status of the image data.

In step S804, the control unit 101 refers to the transmission list and determines whether there is a parameter of image data yet to be referred to. If there is a parameter of image data yet to be referred to (YES in step S804), the processing returns to step S801 and the control unit 101 repeats the processing. If there is no parameter of image data yet to be referred to (NO in step S804), the processing ends.

The processing of the digital camera 100 when wireless connection is switched has been described above. By thus deleting image data of which the transmission status is "transmission reserved" from the transmission list, the digital camera 100 can prevent the image data from being automatically transmitted to a wirelessly connected device not intended by the user. Since the image data itself is not deleted from the transmission list but the transmission status of the image data is changed from the "transmission reserved" to "transmission failed", the user can check the image data not transmitted to the smartphone 200 afterward. For example, the user can check the image data not transmitted to the smartphone 200 by the digital camera 100 displaying the image data of which the transmission status is "transmission failed". In addition, the digital camera 100 can automatically transmit the image data of which the transmission status is "transmission failed" by the user operating the operation unit 105 to register the image data in the transmission list again with the transmission status "transmission reserved". In such a manner, even if the device wirelessly connected to the digital camera 100 is switched, the user can transmit the image data of which the transmission status is "transmission reserved" to the device with which wireless connection is currently established as appropriate.

The digital camera 100 may display a confirmation screen illustrated in FIG. 9 on the display unit 106 before starting the processing of the present exemplary embodiment, when the digital camera 100 switches the device to be wirelessly connected. If "yes" is selected, the control unit 101 performs processing illustrated in FIG. 8. If "no" is selected, the control unit 101 does not perform processing illustrated in FIG. 8. The digital camera 100 can perform the image data automatic transmission processing based on the user's intention by thus inquiring of the user whether to delete the transmission list in advance before performing the processing for updating the transmission list.

Alternatively, the digital camera 100 can prevent automatic transmission of image data not intended by the user by processing, such as deleting the transmission list, and deleting only the image data of which the transmission status is "transmission reserved" from the transmission list. The digital camera 100 can also prevent automatic transmission of image data not intended by the user by changing the transmission statuses of all the pieces of image data to "transmission completed", not to "transmission failed".

In the present exemplary embodiment, the digital camera 100 is described to transmit image data. However, the data to be transmitted is not limited to image data captured by the digital camera 100. The data to be transmitted may be any data that the digital camera 100 can transmit to a smartphone, such as video and audio data generated by the digital camera 100, and image data received by the digital camera 100.

In the present exemplary embodiment, the digital camera 100 is described to be wirelessly connected to a smartphone. However, the digital camera 100 may be connected to a smartphone in a wired manner. For example, the digital camera 100 is connected to a smartphone in a wired manner via the connection unit 111. In this case, the control unit 101 starts the image data automatic transmission processing illustrated in FIG. 7 when triggered by the establishment of the connection with the smartphone via the connection unit 111.

In the present exemplary embodiment, the digital camera 100 is described to automatically transmit image data to a smartphone. However, the present exemplary embodiment is also applicable to a case where the user manually transmits image data from the digital camera 100. Such a case will be briefly described. As in the present exemplary embodiment, the digital camera 100 adds image data captured by the imaging unit 102 to a transmission list. Since the user has an intention to transmit the captured image data to, for example, a smartphone, the transmission status of captured image data is recorded in the transmission list, and thus the user can select the image data to be transmitted to the smartphone afterward. When the user will transmit the image data from the digital camera 100 to the smartphone, the user operates the digital camera 100 to start transmitting the image data. Then, the digital camera 100 performs the processing illustrated in FIG. 7, and transmits the image data of which the transmission status is "transmission reserved" to the smartphone. The processing by which the digital camera 100 updates the transmission list is similar to the foregoing. The processing according to the present exemplary embodiment can thus be applied even in the case where the digital camera 100 accepts user operations and thereby transmits image data to a smartphone. In this case, the digital camera 100 has the function of generating a transmission list. Further, the digital camera 100 does not need to have the image data automatic transmission function.

In the present exemplary embodiment, the digital camera 100 starts the image data automatic transmission processing when triggered by the satisfaction of the condition for entering the power off state. However, other conditions may be used as a trigger. For example, the digital camera 100 may start the image data automatic transmission processing in response to capturing of an image by the user. In this case, the digital camera 100 records the captured image on the recording medium 110, records the image data in the transmission list, and starts the image data automatic transmission processing. The reason for recording the image data in the transmission list is to transmit the image data when wireless connection is established with the smartphone next time, in a case where the digital camera 100 fails to be wirelessly connected to the smartphone. The reason will be briefly described. Even if the digital camera 100 fails to be wirelessly connected to the smartphone, the processing illustrated in FIG. 7 ends at step S700. The image data captured by the digital camera 100 is thus left recorded in the transmission list with the transmission status "transmission reserved". After the digital camera 100 is wirelessly connected, the captured image data can therefore be transmitted to the smartphone if a condition to start the image data automatic transmission processing is satisfied.

Even if a condition for the digital camera 100 to enter the sleep state is satisfied, the digital camera 100 may transition from the power on state to the sleep state and transmit image data. This is because the digital camera 100 is, as described above, less likely to be operated by the user in situations where the digital camera 100 enters the sleep state. On the other hand, when the user has not operated the digital camera 100 for a predetermined time, the user may be making imaging preparations, such as contemplating the composition of a picture. In such a case, the user may immediately operate the digital camera 100 even if the condition to enter the sleep state has been satisfied. On the other hand, the digital camera 100 can clearly determine that the user will not immediately operate the digital camera 100, if the user instructs the digital camera 100 to power off.

Even if the power off instruction is accepted from the user, the control unit 101 may omit performing the image data automatic transmission processing depending on the state of the digital camera 100. For example, in a case where the remaining battery level is low, the power supplied from the power supply unit 109 may become insufficient before the transmission of the image data is completed even if the control unit 101 attempts to transmit the image data. Since the digital camera 100 is forcefully powered off in this case, the control unit 101 can fail to transmit the image data and the image data recorded in the recording medium 110 can even be crashed. If the transmission of the image data is likely to be difficult, the digital camera 100 thus omits performing the image data automatic transmission processing.

The digital camera 100 may start the automatic transmission of image data at a predetermined time. In this case, the digital camera 100 includes a clocking unit that measures time. The digital camera 100 records the time measured by the clocking unit in the metadata of the image data. By using the clocking unit, the digital camera 100 can transmit image data captured by the user in the daytime to a smartphone at night. For example, if the user sets the digital camera 100 to automatically transmit image data at 24:00 (at 0:00 a.m.), the digital camera 100 transmits image data captured on the day before to the smartphone when triggered by the arrival of 24:00.

The automatic transmission of image data may be started if the digital camera 100 is in a predetermined location. In this case, the digital camera 100 includes a Global Positioning System (GPS) module that detects a current position of the digital camera 100. The digital camera 100 records position information, such as the latitude and longitude measured by using the GPS module, in the metadata of the image data. The user can record the position information about his/her own home in the digital camera 100, whereby image data captured outside can be transmitted to the smartphone when the user comes back home. Suppose that the user records the latitude and longitude of his/her own home in the digital camera 100, and sets the digital camera 100 to transmit image data to the smartphone when triggered by coming back home. In this case, the digital camera 100 records image data captured in a place other than home with the transmission status "transmission reserved" in the transmission list. If the digital camera 100 determines that its own position information coincides with the position information about the home, the digital camera 100 starts the image data automatic transmission processing.

In the first exemplary embodiment, the digital camera 100 performs the processing for automatically transmitting image data and the processing for updating the transmission list. In a second exemplary embodiment, a modification of the first exemplary embodiment will be described. A configuration of the digital camera 100 and a network system configuration are similar to those in the first exemplary embodiment.

<When Image Data Automatic Transmission Function is Disabled>

A case where the user disables the image data automatic transmission function will be described. For example, when the image data automatic transmission function of the digital camera 100 is disabled, there can be recorded image data of which the transmission status is "transmission reserved" (hereinafter, referred to as image data A) in the transmission list. If the user re-activates the image data automatic transmission function afterward, image data including the image data A is transmitted to the smartphone by the image data automatic transmission function. However, if the image data automatic transmission function has been disabled for a long time, the user may no longer remember the presence of the image data A and find the image data A useless. From such a reason, it is desirable that the digital camera 100 update the transmission list when the image data automatic transmission function has been disabled.

For example, suppose that the user operates the operation unit 105 to change the item 420 from "yes" to "no" on the screen illustrated in FIG. 4B. In this case, the control unit 101 performs processing for updating the transmission list. The processing is similar to that described in the first exemplary embodiment, illustrated in FIG. 8. Thus, the digital camera 100 can prevent image data useless to the user from being transmitted to the smartphone by updating the transmission list when triggered by the disabling of the image data automatic transmission function.

The digital camera 100 however does not update the transmission list when stopping power supply to the wireless communication unit 112. For example, the digital camera 100 stops supplying power to the wireless communication unit 112 but does not update the transmission list, if the user operates the operation unit 105 to change the item 400 from "on" to "off" on the screen illustrated in FIG. 4B. The reason is that the user operation is intended to turn off the wireless communication function of the digital camera 100, not to turn off the image data automatic transmission function or change the device wirelessly connected to the digital camera 100. Such an operation may be performed, for example, to reduce the power consumption of the digital camera 100. The user's intention here can be considered to be to temporarily stop transmitting image data to the smartphone, but not necessarily to dispense with the captured image data. Thus, the digital camera 100 does not update the transmission list when the function for wireless communication has been turned off <Deletion of Device to be Wirelessly Connected>

If the digital camera 100 is unpaired from the smartphone in the state "current" as described in FIG. 3A or the latest smartphone wirelessly connected, the next device to be wirelessly connected is not necessarily the unpaired smartphone. Unpairing refers to, for example, the digital camera 100 deleting the identification information about the smartphone. In such a case, the digital camera 100 transmits the image data included in the transmission list not to the smartphone connected before but to the switched smartphone, as in the case where the device to be wirelessly connected is switched in the first exemplary embodiment. To prevent such unintended transmission, the digital camera 100 deletes the transmission list when unpaired from the "current" device or the latest device wirelessly connected. An example where the digital camera 100 is unpaired from the "current" device will be described. In this example, the unpairing processing will be described as processing for deleting the communication settings of the device wirelessly connected.

FIG. 10A illustrates an example of a screen for editing or deleting settings of devices to be wirelessly connected, which the digital camera 100 displays on the display unit 106. If the user selects an item 1000, the digital camera 100 transitions to a setting screen related to communication of the smartphone 200 as illustrated in FIG. 10B. In FIG. 10B, the user can change and delete communication settings between the digital camera 100 and the smartphone 200. If the user selects an item 1010, communication settings of the smartphone 200 recorded in the digital camera 100 can be changed. If the user selects an item 1011, the digital camera 100 displays a confirmation screen illustrated in FIG. 10C. By using the screen illustrated in FIG. 10C, the digital camera 100 inquires of the user whether to delete the communication settings of the smartphone 200. If the user selects "OK", the digital camera 100 deletes the communication settings of the smartphone 200. Since the smartphone 200 is in the state "current", the digital camera 100 further performs the processing described in FIG. 8 according to the first exemplary embodiment, and updates the transmission list. If the user selects "cancel", the digital camera 100 returns to the screen as illustrated in FIG. 10B.

Return to the description of FIG. 10A. If the user selects an item 1001 on the screen illustrated in FIG. 10A, the digital camera 100 transitions to a setting screen related to communication with the smartphone 300. The setting screen is similar to that of the foregoing with the smartphone 200. However, the processing of the digital camera 100 is different when the communication settings of the smartphone 300 are deleted. Since the smartphone 300 is not in the state "current", the digital camera 100 does not automatically transmit image data to the smartphone 300. Thus, the digital camera 100 is not required to delete the transmission list. On the contrary, if the digital camera 100 deletes the transmission list, the digital camera 100 can be unable to transmit image data to the smartphone 200. Thus, the digital camera 100 does not perform processing for updating the transmission list if the communication settings of a non-"current" device have been deleted.

Return to the description of FIG. 10A. If the user selects an item 1002, the digital camera 100 deletes the communication settings of all the devices recorded in the digital camera 100. In this case, the digital camera 100 displays a confirmation screen illustrated in FIG. 10D before deleting the communication settings of all the devices. If the user selects "OK" on this screen, the digital camera 100 deletes the communication settings of all the devices. Since all the devices to transmit image data are deleted from the digital camera 100, the digital camera 100 also deletes the transmission list. If the user selects "cancel" on this screen, the digital camera 100 returns to the screen illustrated in FIG. 10A. In such a case, the digital camera 100 does not update the transmission list.

As described above, the digital camera 100 updates the transmission list, if the digital camera 100 is unpaired from the device to which image data is automatically transmitted.

The digital camera 100 does not update the transmission list, if the digital camera 100 is unpaired from a device other than the one to which image data is automatically transmitted. In such a manner, image data can be automatically transmitted to the device intended by the user, and the image data can be prevented from being automatically transmitted to a device not intended by the user.

Similar processing can be applied in a case where the digital camera 100 has not established wireless connection with a smartphone. In this case, the item 1000 illustrated in FIG. 10A displays the latest smartphone to which the digital camera 100 is wirelessly connected without indicating "current". Thus, the digital camera 100 updates the transmission list, if the digital camera 100 is unpaired from the device displayed on the item 1000. The digital camera 100 does not update the transmission list, if the digital camera 100 is unpaired from the device displayed on the item 1001.

Other Embodiments

An exemplary embodiment of the present disclosure can be implemented by processing for supplying a program for implementing one or more functions of the foregoing exemplary embodiments to a system or an apparatus via a network or a storage medium, and reading and executing the program by one or more processors in a computer of the system or apparatus. A circuit (such as an application specific integrated circuit (ASIC)) for implementing one or more functions can also be used for implementation.

The present disclosure is not limited to the foregoing exemplary embodiments themselves, and in the phase of implementation, the components can be modified and practiced without departing from the gist thereof. Various disclosures can be formed by appropriately combining a plurality of components described in the foregoing exemplary embodiments. For example, several components may be omitted from among all the components described in the exemplary embodiments. Components according to different exemplary embodiments may be combined as appropriate.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-055762, filed Mar. 23, 2019, which is hereby incorporated by reference herein in its entirety.

What is claimed is:

1. An imaging apparatus comprising:
a communication unit configured to communicate with an external apparatus;
an operation unit configured to accept a user operation;
an imaging unit configured to capture an image as imaging data;
a recording unit configured to record data in the recording unit; and
a control unit configured to perform operations including:
controlling, in a case where connection is established with the external apparatus via the communication unit, the recording unit to record identification information about the external apparatus,
controlling, in a case where the imaging unit captures the image in a state where the identification information about the external apparatus is recorded, the recording unit to record, as a transmission target, the imaging data captured by the imaging unit,
controlling, in a case where an operation to transition from a first power supply state to a second power supply state having power consumption lower than power consumption of the first power supply state is accepted by the operation unit, the communication unit to transmit the imaging data transmission target to a first external apparatus connected most recent by the communication unit, and
managing, in a case where connection is established with a second external apparatus different from the first external apparatus by the communication unit based on the user operation accepted by the operation unit, the recorded imaging data transmission target as a non-transmission target.

2. The imaging apparatus according to claim 1, wherein, even in a case where the imaging unit captures the image in a state where communication is difficult with the communication unit, the control unit controls the recording unit not to record the captured imaging data as the transmission target.

3. The imaging apparatus according to claim 1, wherein controlling the recording unit to record the imaging data captured by the imaging unit as the transmission target includes recording a filename and a transmission status of the imaging data in association with each other.

4. The imaging apparatus according to claim 3,
wherein managing the recorded imaging data transmission target as the non-transmission target includes executing any one of a plurality of options, and
wherein the plurality of options includes deleting a file in which the filename and the transmission status of the imaging data are recorded in association with each other, changing the transmission status to transmission completed, and changing the transmission status to transmission failed.

5. The imaging apparatus according to claim 1,
wherein, in a case where the imaging unit captures the image after the connection with the second external apparatus is established, controlling includes controlling the recording unit to record, as the transmission target, the imaging data captured by the imaging unit, and
wherein, in the case where the operation to transition from the first power supply state to the second power supply state having the power consumption lower than the power consumption of the first power supply state is accepted by the operation unit, controlling includes controlling the communication unit to transmit the imaging data transmission target to the second external apparatus by the communication unit.

6. The imaging apparatus according to claim 1, wherein, in deleting identification information about the first external apparatus, managing includes managing the recorded imaging data transmission target as the non-transmission target.

7. The imaging apparatus according to claim 1, further comprising a display unit,
wherein, in a case where the connection with the second external apparatus is established by the communication unit based on the user operation accepted by the operation unit, controlling includes controlling the display unit to display a screen confirming whether to manage the recorded imaging data transmission target as the non-transmission target.

8. The imaging apparatus according to claim 1, further comprising a display unit,
wherein, in a case where the display unit displays a list of external apparatuses about which identification information is recorded, controlling includes controlling the display unit to display the first external apparatus connected most recent at a top.

9. The imaging apparatus according to claim 1, wherein the first power supply state is a power on state, and the second power supply state is a power off state.

10. The imaging apparatus according to claim 1,
wherein, in transitioning from the first power supply state to a third power supply state based on a fact that the operation unit has not accepted an operation from a user for a predetermined time or more, controlling includes controlling the communication unit not to transmit the imaging data, and
wherein the third power supply state has power consumption lower than the power consumption of the first power supply state and higher than the power consumption of the second power supply state.

11. The imaging apparatus according to claim 1, wherein, even in a case where a remaining battery level is low and the operation to transition from the first power supply state to the second power supply state is accepted by the operation unit, controlling includes controlling the communication unit not to transmit the imaging data transmission target.

12. The imaging apparatus according to claim 1, wherein, in a case where it is determined to be a predetermined time or the imaging apparatus is determined to be in a predetermined location, controlling includes controlling the communication unit to transmit the imaging data transmission target to the first external apparatus.

13. The imaging apparatus according to claim 1, wherein the control unit is configured to connect to the external apparatus via the communication unit in compliance with Bluetooth®.

14. The imaging apparatus according to claim 13, wherein the identification information about the external apparatus is pairing information.

15. A method for an imaging apparatus having a communication unit configured to communicate with an external apparatus, an operation unit configured to accept a user operation, an imaging unit configured to capture an image as imaging data, and a recording unit configured to record data in the recording unit, the method comprising:
controlling, in a case where connection is established with the external apparatus via the communication unit, the recording unit to record identification information about the external apparatus;
controlling, in a case where the imaging unit captures the image in a state where the identification information about the external apparatus is recorded, the recording unit to record, as a transmission target, the imaging data captured by the imaging unit;
controlling, in a case where an operation to transition from a first power supply state to a second power supply state having power consumption lower than power consumption of the first power supply state is accepted by the operation unit, the communication unit to transmit the imaging data transmission target to a first external apparatus connected most recent by the communication unit; and
managing, in a case where connection is established with a second external apparatus different from the first external apparatus by the communication unit based on the user operation accepted by the operation unit, the recorded imaging data transmission target as a non-transmission target.

16. A non-transitory computer-readable storage medium storing a program to cause a computer to perform a method for an imaging apparatus having a communication unit configured to communicate with an external apparatus, an operation unit configured to accept a user operation, an imaging unit configured to capture an image as imaging data, and a recording unit configured to record data in the recording unit, the method comprising:
controlling, in a case where connection is established with the external apparatus via the communication unit, the recording unit to record identification information about the external apparatus;
controlling, in a case where the imaging unit captures the image in a state where the identification information about the external apparatus is recorded, the recording unit to record, as a transmission target, the imaging data captured by the imaging unit;
controlling, in a case where an operation to transition from a first power supply state to a second power supply state having power consumption lower than power consumption of the first power supply state is accepted by the operation unit, the communication unit to transmit the imaging data transmission target to a first external apparatus connected most recent by the communication unit; and
managing, in a case where connection is established with a second external apparatus different from the first external apparatus by the communication unit based on the user operation accepted by the operation unit, the recorded imaging data transmission target as a non-transmission target.

17. An imaging apparatus comprising:
a communication unit configured to communicate with an external apparatus;

an operation unit configured to accept a user operation;
an imaging unit configured to capture an image as imaging data;
a recording unit configured to record data in the recording unit; and
a control unit configured to perform operations including:
controlling, in a case where connection is established with the external apparatus via the communication unit, the recording unit to record identification information about the external apparatus,
controlling, in a case where the imaging unit captures the image in a state where the identification information about the external apparatus is recorded, the recording unit to record, as a transmission target, the imaging data captured by the imaging unit,
controlling, in a case where an operation to transition from a first power supply state to a second power supply state having power consumption lower than power consumption of the first power supply state is accepted by the operation unit, the communication unit to transmit the imaging data transmission target to the external apparatus indicated by the identification information, and
managing, in a case where the identification information is deleted, the recorded imaging data transmission target as a non-transmission target.

18. The imaging apparatus according to claim 17, further comprising a display,
wherein, in the case where the identification information is deleted, the control unit controls the display to display a screen for confirmation as to whether it is all right to manage, as a non-transmission target, the recorded imaging data transmission target.

19. The imaging apparatus according to claim 17, wherein, even when not connected to the external apparatus indicated by the identification information, in the case where the imaging unit captures the image in the state where the identification information about the external apparatus is recorded, the recording unit is controlled to record, as the transmission target, the imaging data captured by the imaging unit.

20. The imaging apparatus according to claim 17, wherein an instruction for changing the imaging data recorded as non-transmission target into the transmission target is received via the operation unit.

21. A method for an imaging apparatus having a communication unit configured to communicate with an external apparatus, an operation unit configured to accept a user operation, an imaging unit configured to capture an image as imaging data, and a recording unit configured to record data in the recording unit, the method comprising
controlling, in a case where connection is established with the external apparatus via the communication unit, the recording unit to record identification information about the external apparatus;
controlling, in a case where the imaging unit captures the image in a state where the identification information about the external apparatus is recorded, the recording unit to record, as a transmission target, the imaging data captured by the imaging unit;
controlling, in a case where an operation to transition from a first power supply state to a second power supply state having power consumption lower than power consumption of the first power supply state is accepted by the operation unit, the communication unit to transmit the imaging data transmission target to the external apparatus indicated by the identification information; and
managing, in a case where the identification information is deleted, the recorded imaging data transmission target as a non-transmission target.

22. A non-transitory computer-readable storage medium storing a program to cause a computer to perform a method for an imaging apparatus having a communication unit configured to communicate with an external apparatus, an operation unit configured to accept a user operation, an imaging unit configured to capture an image as imaging data, and a recording unit configured to record data in the recording unit, the method comprising
controlling, in a case where connection is established with the external apparatus via the communication unit, the recording unit to record identification information about the external apparatus;
controlling, in a case where the imaging unit captures the image in a state where the identification information about the external apparatus is recorded, the recording unit to record, as a transmission target, the imaging data captured by the imaging unit;
controlling, in a case where an operation to transition from a first power supply state to a second power supply state having power consumption lower than power consumption of the first power supply state is accepted by the operation unit, the communication unit to transmit the imaging data transmission target to the external apparatus indicated by the identification information; and
managing, in a case where the identification information is deleted, the recorded imaging data transmission target as a non-transmission target.

23. An imaging apparatus comprising:
a communication unit configured to communicate with an external apparatus;
an operation unit configured to accept a user operation;
an imaging unit configured to capture an image as imaging data;
a recording unit configured to record data in the recording unit; and
a control unit configured to perform operations including:
controlling, in a case where connection is established with the external apparatus via the communication unit, the recording unit to record identification information about the external apparatus,
controlling, in a case where the imaging unit captures the image in a state where the identification information about the external apparatus is recorded, the recording unit to record, as a transmission target, the imaging data captured by the imaging unit,
controlling, in a case where an operation to transition from a first power supply state to a second power supply state having power consumption lower than power consumption of the first power supply state is accepted by the operation unit, the communication unit to transmit the imaging data transmission target to the external apparatus indicated by the identification information, and
managing, in a case where, after the identification information is deleted, connection is established with another apparatus different from the external apparatus indicated by the identification information by the communication unit based on the user operation accepted by the operation unit, the recorded imaging data transmission target as a non-transmission target.

24. The imaging apparatus according to claim 23, further comprising a display,
wherein, in the case where the identification information is deleted, the control unit controls the display to display a screen for confirmation as to whether it is all right to manage, as a non-transmission target, the recorded imaging data transmission target.

25. The imaging apparatus according to claim 23, wherein, even when not connected to the external apparatus indicated by the identification information, in the case where the imaging unit captures the image in the state where the identification information about the external apparatus is recorded, the recording unit is controlled to record, as the transmission target, the imaging data captured by the imaging unit.

26. The imaging apparatus according to claim 23, wherein an instruction for changing the imaging data recorded as non-transmission target into the transmission target is received via the operation unit.

27. A method for an imaging apparatus having a communication unit configured to communicate with an external apparatus, an operation unit configured to accept a user operation, an imaging unit configured to capture an image as imaging data, and a recording unit configured to record data in the recording unit, the method comprising:
controlling, in a case where connection is established with the external apparatus via the communication unit, the recording unit to record identification information about the external apparatus;
controlling, in a case where the imaging unit captures the image in a state where the identification information about the external apparatus is recorded, the recording unit to record, as a transmission target, the imaging data captured by the imaging unit;
controlling, in a case where an operation to transition from a first power supply state to a second power supply state having power consumption lower than power consumption of the first power supply state is accepted by the operation unit, the communication unit to transmit the imaging data transmission target to the external apparatus indicated by the identification information; and
managing, in a case where, after the identification information is deleted, connection is established with another apparatus different from the external apparatus indicated by the identification information by the communication unit based on the user operation accepted by the operation unit, the recorded imaging data transmission target as a non-transmission target.

28. A non-transitory computer-readable storage medium storing a program to cause a computer to perform a method for an imaging apparatus having a communication unit configured to communicate with an external apparatus, an operation unit configured to accept a user operation, an imaging unit configured to capture an image as imaging data, and a recording unit configured to record data in the recording unit, the method comprising:
controlling, in a case where connection is established with the external apparatus via the communication unit, the recording unit to record identification information about the external apparatus;
controlling, in a case where the imaging unit captures the image in a state where the identification information about the external apparatus is recorded, the recording unit to record, as a transmission target, the imaging data captured by the imaging unit;
controlling, in a case where an operation to transition from a first power supply state to a second power supply state having power consumption lower than power consumption of the first power supply state is accepted by the operation unit, the communication unit to transmit the imaging data transmission target to the external apparatus indicated by the identification information; and
managing, in a case where, after the identification information is deleted, connection is established with another apparatus different from the external apparatus indicated by the identification information by the communication unit based on the user operation accepted by the operation unit, the recorded imaging data transmission target as a non-transmission target.

29. An imaging apparatus comprising:
a communication unit configured to communicate with an external apparatus;
an operation unit configured to accept a user operation;
an imaging unit configured to capture an image as imaging data;
a recording unit configured to record data in the recording unit; and
a control unit configured to perform operations including:
controlling, in a case where connection is established with the external apparatus via the communication unit, the recording unit to record identification information about the external apparatus,
controlling a transfer reservation function, wherein the transfer reservation function is a function of, on condition that the imaging data captured by the imaging unit is managed as a transmission target and that an operation to transition from a first power supply state to a second power supply state having power consumption lower than power consumption of the first power supply state is accepted by the operation unit, transmitting, via the communication unit, the imaging data managed as the transmission target to the external apparatus indicated by the identification information,
managing, in a case where the transfer reservation function is disabled, the recorded imaging data transmission target as a non-transmission target, and
managing such that, even when the communication unit is disabled, the recorded imaging data transmission target remains as the transmission target.

30. The imaging apparatus according to claim 29, wherein an instruction for changing the imaging data recorded as non-transmission target into the transmission target is received via the operation unit.

31. A method for an imaging apparatus having a communication unit configured to communicate with an external apparatus, an operation unit configured to accept a user operation, an imaging unit configured to capture an image as imaging data, and a recording unit configured to record data in the recording unit, the method comprising:
controlling, in a case where connection is established with the external apparatus via the communication unit, the recording unit to record identification information about the external apparatus;
controlling a transfer reservation function, wherein the transfer reservation function is a function of, on condition that the imaging data captured by the imaging unit is managed as a transmission target and that an operation to transition from a first power supply state to a second power supply state having power consumption lower than power consumption of the first power supply state is accepted by the operation unit, transmitting, via the communication unit, the imaging data managed as the transmission target to the external apparatus indicated by the identification information;

managing, in a case where the transfer reservation function is disabled, the recorded imaging data transmission target as a non-transmission target; and managing such that, even when the communication unit is disabled, the recorded imaging data transmission target remains as the transmission target.

32. A non-transitory computer-readable storage medium storing a program to cause a computer to perform a method for an imaging apparatus having a communication unit configured to communicate with an external apparatus, an operation unit configured to accept a user operation, an imaging unit configured to capture an image as imaging data, and a recording unit configured to record data in the recording unit, the method comprising:

controlling, in a case where connection is established with the external apparatus via the communication unit, the recording unit to record identification information about the external apparatus;

controlling a transfer reservation function, wherein the transfer reservation function is a function of, on condition that the imaging data captured by the imaging unit is managed as a transmission target and that an operation to transition from a first power supply state to a second power supply state having power consumption lower than power consumption of the first power supply state is accepted by the operation unit, transmitting, via the communication unit, the imaging data managed as the transmission target to the external apparatus indicated by the identification information;

managing, in a case where the transfer reservation function is disabled, the recorded imaging data transmission target as a non-transmission target; and managing such that, even when the communication unit is disabled, the recorded imaging data transmission target remains as the transmission target.

\* \* \* \* \*